(12) United States Patent
Zeng et al.

(10) Patent No.: US 10,983,384 B2
(45) Date of Patent: Apr. 20, 2021

(54) POLARIZER AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shibiao Zeng, Beijing (CN); Xiaodong Han, Beijing (CN); Jianhe Li, Beijing (CN); Qi Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 480 days.

(21) Appl. No.: 15/776,046

(22) PCT Filed: Sep. 29, 2017

(86) PCT No.: PCT/CN2017/104561
§ 371 (c)(1),
(2) Date: May 14, 2018

(87) PCT Pub. No.: WO2018/166182
PCT Pub. Date: Sep. 20, 2018

(65) Prior Publication Data
US 2020/0285101 A1 Sep. 10, 2020

(30) Foreign Application Priority Data
Mar. 17, 2017 (CN) .......................... 201710161877.2

(51) Int. Cl.
*G02F 1/1335* (2006.01)

(52) U.S. Cl.
CPC .. *G02F 1/133504* (2013.01); *G02F 1/133528* (2013.01); *G02F 2202/28* (2013.01)

(58) Field of Classification Search
CPC ......... G02F 1/133504; G02F 1/133528; G02F 2202/28; G02B 5/0236; G02B 5/0242; G02B 5/0247; G02B 6/0025
See application file for complete search history.

(56) References Cited

FOREIGN PATENT DOCUMENTS

| CN | 101315438 A | 12/2008 |
| CN | 102576098 A | 7/2012 |
| CN | 104950375 A | 9/2015 |
| CN | 106896567 A | 6/2017 |
| JP | 2008-003625 A | 1/2008 |
| JP | 2009-133907 A | 6/2009 |

(Continued)

OTHER PUBLICATIONS

First Office Action issued in Chinese Patent Application No. 201710161877.2, dated Jan. 2, 2018; with English translation.

(Continued)

*Primary Examiner* — Jessica M Merlin
(74) *Attorney, Agent, or Firm* — McDermott Will & Emery LLP

(57) ABSTRACT

A polarizer includes a light uniformizing structure. The light uniformizing structure includes a light-diffusion particle layer. The light-diffusion particle layer is configured to improve uniformity of light rays passing through the polarizer.

10 Claims, 3 Drawing Sheets

(56) References Cited

FOREIGN PATENT DOCUMENTS

JP        2012027460 A   *   2/2012
TW       201219846 A      5/2012

OTHER PUBLICATIONS

Notification of the Second Office Action issued in Chinese Patent Application No. 201710161877.2, dated Sep. 21, 2018; with English translation.
International Search Report and Written Opinion issued in International Patent Application No. PCT/CN2017/104561, dated Dec. 29, 2017; with English translation.

* cited by examiner

POLARIZER AND DISPLAY DEVICE

CROSS-REFERENCE TO RELATED APPLICATION

This application is a national phase entry under 35 USC 371 of International Patent Application No. PCT/CN2017/104561 filed on Sep. 29, 2017, which claims priority to Chinese Patent Application No. 201710161877.2, filed with Chinese Patent Office on Mar. 17, 2017 and titled "POLARIZER AND DISPLAY DEVICE", which are incorporated herein by reference in their entirety.

TECHNICAL FIELD

The present disclosure relates to the field of display technology, and in particular, to a polarizer and a display device.

BACKGROUND

A liquid crystal display panel is formed by two substrates arranged oppositely and a liquid crystal layer encapsulated between the two substrates. Display light rays emitted from the liquid crystal display panel need to pass through a multilayer structure, so that the uniformity of the emitted light rays is low. Similarly, a backlight module that provides a backlight source comprises multiple layers of optical films that are stacked, so that the uniformity of the emitted light rays therefrom is also low.

SUMMARY

Some embodiments of the present disclosure adopt the following technical solutions:

In a first aspect, a polarizer is provided. The polarizer comprises a light uniformizing structure, wherein the light uniformizing structure comprises a light-diffusion particle layer, and the light-diffusion particle layer is configured to improve uniformity of light rays passing through the polarizer.

In some embodiments, the polarizer further comprises a polarizer base layer disposed on one side of the light uniformizing structure and a pressure-sensitive adhesive layer disposed on another side of the light uniformizing structure.

In some embodiments, the light uniformizing structure further comprises a first transmission film. A surface, away from the light-diffusion particle layer, of the first transmission film has a plurality of strip-shaped protrusions arranged thereon in parallel, and each of the plurality of strip-shaped protrusions is triangular in a cross-section perpendicular to its extension direction. The first transmission film is disposed on a side, close to the polarizer base layer, of the light-diffusion particle layer; or the first transmission film is disposed on a side, close to the pressure-sensitive adhesive layer, of the light-diffusion particle layer.

In some embodiments, a shape of a diffusion particle in the light-diffusion particle layer is spherical.

In some embodiments, a particle size of a diffusion particle in the light-diffusion particle layer is about 1 to 20 μm.

In some embodiments, a material of a diffusion particle in the light-diffusion particle layer is at least one of polystyrene, polymethyl methacrylate, polycarbonate or silica.

In some embodiments, a main body of the light-diffusion particle layer is a transparent film layer.

In some embodiments, an edge height of one of the plurality of strip-shaped protrusions is in a value range of about 35 μm<the edge height 45 μm.

In some embodiments, a vertex angle formed by two sides of one of the plurality of strip-shaped protrusions is in an angle range of about 115°<the vertex angle≤125°.

In some embodiments, the light uniformizing structure further comprises a second transmission film disposed on a side, away from the first transmission film, of the light-diffusion particle layer.

In some embodiments, a material of the first transmission film is polyethylene terephthalate, and/or, a material of the second transmission film is polyethylene terephthalate.

In some embodiments, the polarizer base layer comprises a first triacetate cellulose film, a polyvinyl alcohol film and a second triacetate cellulose film which are away from the light uniformizing structure in sequence.

In some embodiments, the polarizer further comprises a mold release film fitted on a side, away from the light uniformizing structure, of the pressure-sensitive adhesive layer, and/or a protective film fitted on a surface of the polarizer base layer.

In a second aspect, a display device is provided. The display device comprises a display panel, wherein the display device further comprises the foregoing polarizer disposed on at least one of two sides of the display panel.

Optionally, the polarizer is disposed on a display side of the display panel; the light uniformizing structure further comprises the first light transmission film disposed on the side, away from the display side, of the light-diffusion particle layer; and the surface, away from the light-diffusion particle layer, of the first transmission film has a plurality of strip-shaped protrusions arranged thereon in parallel, wherein each of the plurality of strip-shaped protrusions is triangular in a cross-section perpendicular to its extension direction. Or, the polarizer is disposed on the side of the display panel which is away from the display side of the display panel; the light uniformizing structure further comprises the first transmission film disposed on the side, close to the display panel, of the light-diffusion particle layer; and the surface, away from the light-diffusion particle layer, of the first transmission film has the plurality of strip-shaped protrusions arranged thereon in parallel, wherein each of the plurality of strip-shaped protrusions is triangular in a cross-section perpendicular to its extension direction.

BRIEF DESCRIPTION OF THE DRAWINGS

To describe technical solutions in embodiments of the present disclosure more clearly, the following briefly introduces the accompanying drawings to be used for describing embodiments. Apparently, the accompanying drawings in the following description show merely some of the embodiments of the present disclosure, and for those skilled in the art, other drawings may be obtained based on these drawings without creative efforts.

DETAILED DESCRIPTION

The technical solutions in the embodiments of the present disclosure will be clearly and completely described below with reference to the accompanying drawings in embodiments of the present disclosure. Apparently, the described embodiments are only a part but not all of the embodiments of the present disclosure. All other embodiments obtained by those skilled in the art based on the embodiments of the present disclosure without creative efforts shall be included in the protection scope of the present disclosure.

It should be noted that all terms (including technical and scientific terms) used in the embodiments of the present disclosure respectively have the same meanings as commonly understood by those skilled in the art to which the present disclosure belongs, unless otherwise defined. It will be further understood that terms, such as those defined in dictionaries commonly used, should be respectively interpreted as having the meanings consistent with their meanings in the contexts of the relevant arts and should not be interpreted in an idealized or overly formalized sense unless expressly so defined herein.

For example, the terms "first", "second" and the like used in the present description and claims do not denote any sequence, quantity or importance, but merely serve to distinguish different components. The use of "comprise", "include" or the like means that an element or article preceding the words covers elements or items following the words and their equivalents, but do not exclude other elements or items. The terms "on/above", "under/below" or the like indicate the orientation or positional relationship based on the orientation or positional relationship shown in the accompanying drawings, merely being simplified description for the convenience of explanation of technical solutions of the present disclosure, rather than indicating or implying that the referred device or element must have a particular orientation or be constructed and operated in a particular orientation, and therefore should not be construed as limitations to the present disclosure.

In addition, since some actual sizes, such as those of diffusion particles in a light-diffusion particle layer, involved in embodiments of the present disclosure are very small, the structural dimensions in the accompanying drawings of embodiments of the present disclosure are magnified for the sake of clarity, and do not represent the actual sizes and proportion.

Figure 1:
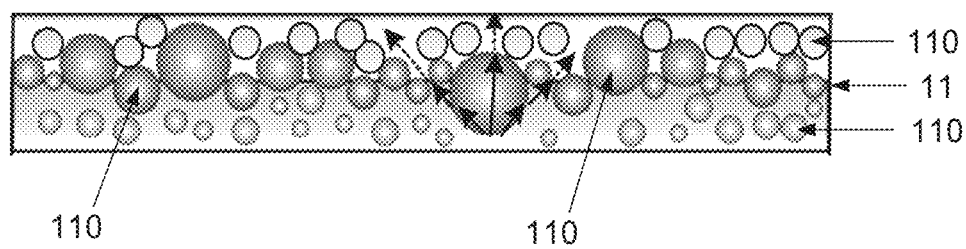
FIG. 1 is a first diagram of a cross-sectional structure of a polarizer provided by embodiments of the present disclosure.

As shown in FIG. 1, embodiments of the present disclosure provides a polarizer. The polarizer comprises a light uniformizing structure 10. The light uniformizing structure 10 comprises a light-diffusion particle layer 11 which is configured to improve uniformity of light rays passing through the polarizer.

It should be noted that, many diffusion particles 110 are dispersed in the light-diffusion particle layer 11, and the diffusion particles 110 are able to adjust the directions of some light rays transmitted, making the light rays which pass through the polarizer more uniform.

In embodiments of the present disclosure, the so-called "particle" refers to a geometric body having a characteristic shape within a range of certain size. The certain size quoted herein is usually from nanoscale to millimeter-scale. Therefore, the foregoing diffusion particles refer to particles with sizes in small order of magnitude, and the microscopic specific shape thereof is not limited to spherical shape, but is able to be a variety of shapes without limits.

FIG. 1 is only to show a dispersion state of the diffusion particles 110 in the light-diffusion particle layer 11. The sizes of the diffusion particles 110 are able to be the same or different, which is not limited in embodiments of the present disclosure.

A polarizer (abbreviated to POL) is an optical film which is composited from multiple layers of polymer material and has a function of generating polarized light. Upon used in a liquid crystal display panel, the polarizer is able to convert a beam of natural light without polarization into a beam of polarized light, and let the light rays perpendicular to an electric field direction pass through, so this liquid crystal display panel is able to properly display an image. The polarizer is one of key elements that affect the display effect of the liquid crystal display panel.

The foregoing polarizer provided by embodiments of the present disclosure has the light uniformizing structure 10, the light uniformizing structure 10 comprises the light-diffusion particle layer 11 in which the diffusion particles 110 is dispersed, and the diffusion particles 110 increase the degree of the contact with light rays (as indicated by dotted arrows around a diffusion particle 110 in FIG. 1), thereby adjusting some light ray directions, so as to make the light rays passing through the polarizer more uniform. When the polarizer is specifically disposed on a display side of the liquid crystal display panel as an upper polarizer, uniformity of display light rays emitted from the display panel may be improved and display quality is thereby improved. When the polarizer is specifically disposed on a side, close to a backlight module, of the liquid crystal display panel as a lower polarizer, uniformity of backlight rays emitted from the backlight module may be improved and the display quality is thereby improved.

Further, a main body of the light-diffusion particle layer 11 is a transparent film layer, and the material thereof is able to be a transparent film layer commonly used in an optical film, such as polyethylene terephthalate (PET), so as to fix the diffusion particles 110.

The material of the diffusion particles 110 is able to be at least one of poly styrene (abbreviated to PS, also called styrene resin), polymethyl methacrylate (abbreviated to PMMA, also called acrylic resin), polycarbonate (abbreviated to PC) or silica ($SiO_2$).

The diffusion particles 110 is able to be spherical to improve the contact area for adjusting light rays. The particle size (i.e., the diameter) thereof is able to be about 1 to 20 μm. In one embodiment, the particle size is 1 μm. In another embodiment, the particle size is 10 μm. In another embodiment, the particle size is 20 μm.

Figure 2:
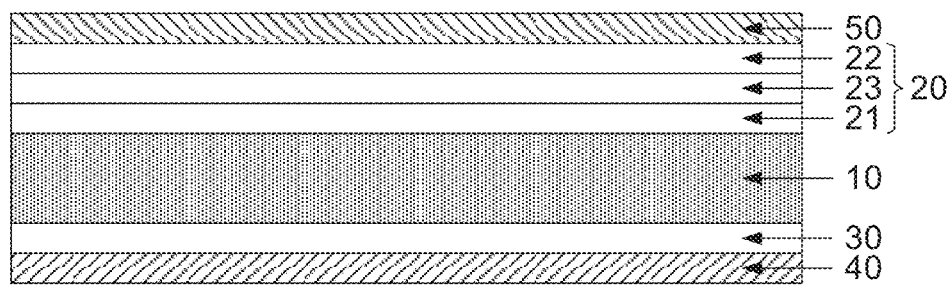
FIG. 2 is a second diagram of a cross-sectional structure of a polarizer provided by embodiments of the present disclosure.
Figure 3:
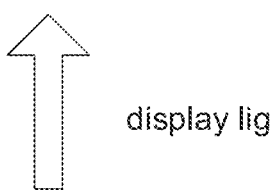
FIG. 3 is a third diagram of a cross-sectional structure of a polarizer provided by embodiments of the present disclosure.
Figure 3:
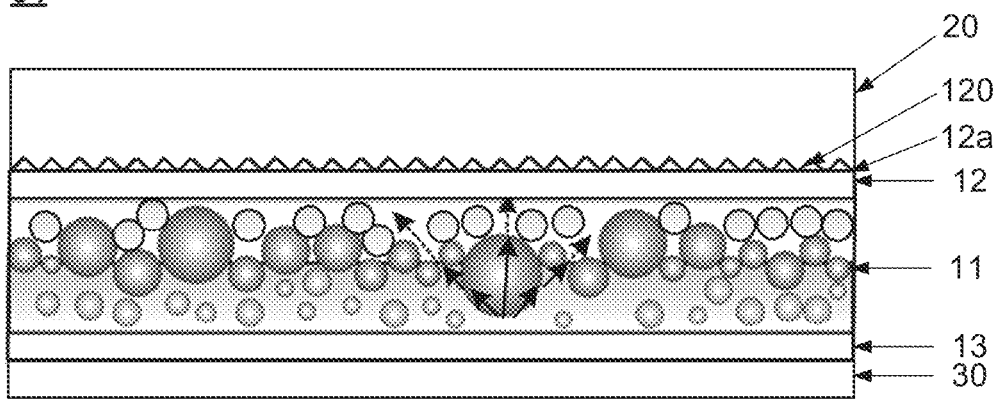
Figure 4:
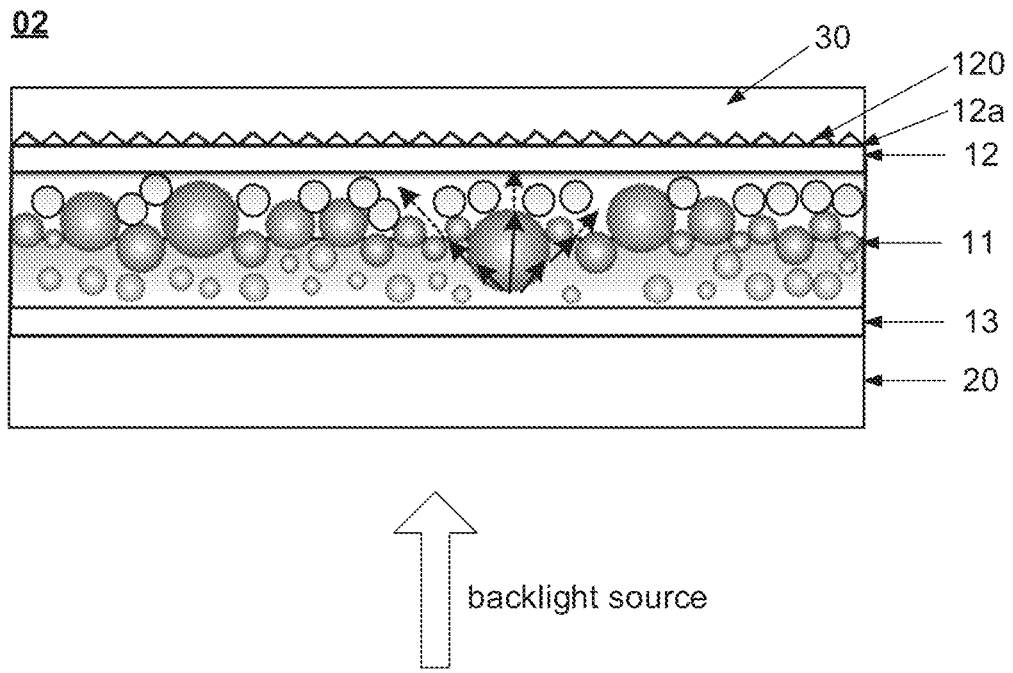
FIG. 4 is a fourth diagram of a cross-sectional structure of a polarizer provided by embodiments of the present disclosure.

Based on the above, as shown in FIG. 2, the polarizer provided in embodiments of the present disclosure further comprises the following structure: a polarizer base layer 20 disposed on one side of the light uniformizing structure 10 and a pressure-sensitive adhesive layer 30 disposed on another side of the light uniformizing structure 10. As shown in FIG. 3 or FIG. 4, the foregoing light uniformizing structure 10 further comprises a first transmission film 12. A surface 12a, away from the light-diffusion particle layer 11, of the first transmission film 12 has a plurality of strip-shaped protrusions 120 arranged thereon in parallel. Each strip-shaped protrusion 120 is triangular in a cross-section perpendicular to its extension direction.

It should be noted that, the overall shape of the foregoing polarizer is generally rectangular, and the extension direction of the strip-shaped protrusions 120 is able to extend along any one side of the rectangle. That is, when the plane direction of the polarizer is parallel to the paper surface, the extension direction of the strip-shaped protrusions 120 is able to be transverse or lengthways, which is not specifically limited.

The shape of a strip-shaped protrusion 120 is triangular in the cross-section perpendicular to its extension direction, that is, the shape of linking together the cross sections of the plurality of strip-shaped protrusions 120 is serrated.

Referring further to FIG. 3, the first transmission film 12 is disposed on a side, close to the polarizer base layer 20, of the light-diffusion particle layer 11. That is, the polarizer having this structure is the upper polarizer 01 disposed on the display side of the display panel, and the light rays emitted from the polarizer is display light.

Figure 5:
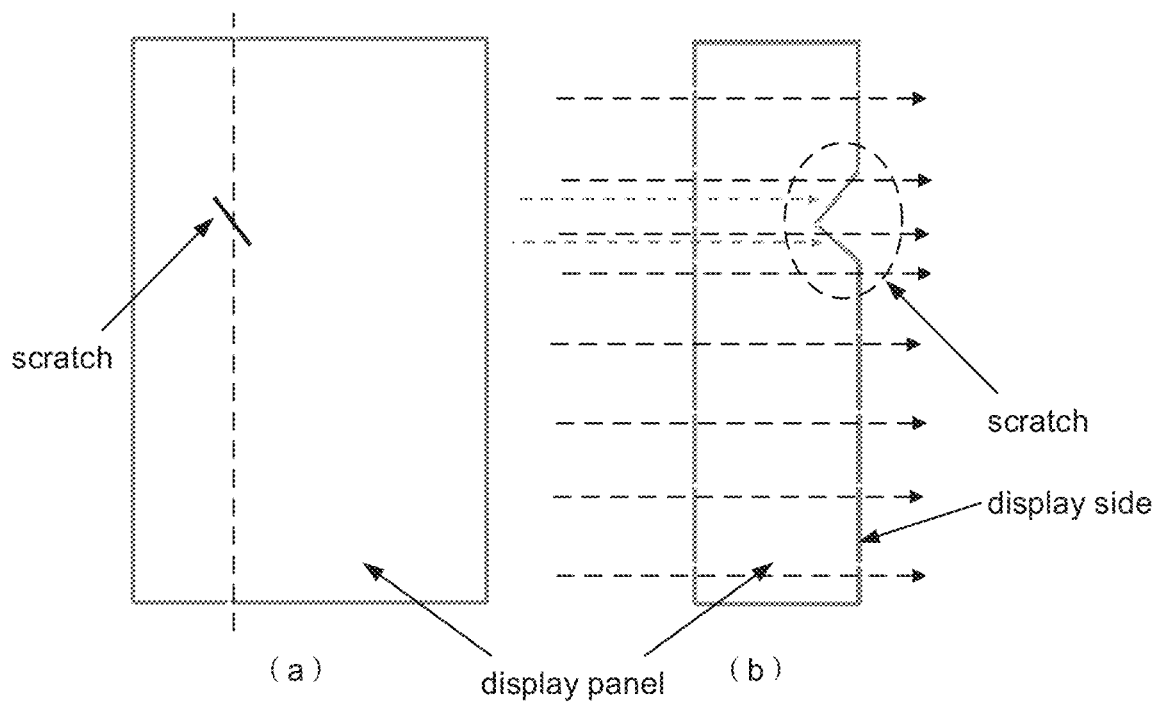
FIG. 5 is a diagram of a front view direction (part (a) in the Fig.) and a cross-sectional direction (part (b) in the Fig.) of that light rays pass through a scratch area when there is a scratch on a display side of a display panel or on a surface for attaching of a polarizer.

In the production process of the liquid crystal display panel, the outer surface of the panel is sometimes scratched slightly in appearance due to various reasons, or during the process of POL attaching, the surface for attaching of the POL (i.e., a surface of the pressure-sensitive adhesive layer 30) is sometimes scratched, or the like. As shown in FIG. 5, when light rays passes through a panel screen, if the display side of the liquid crystal display panel has an abnormality like slight scratch, brightness of the light passing through this area dims.

Figure 6:
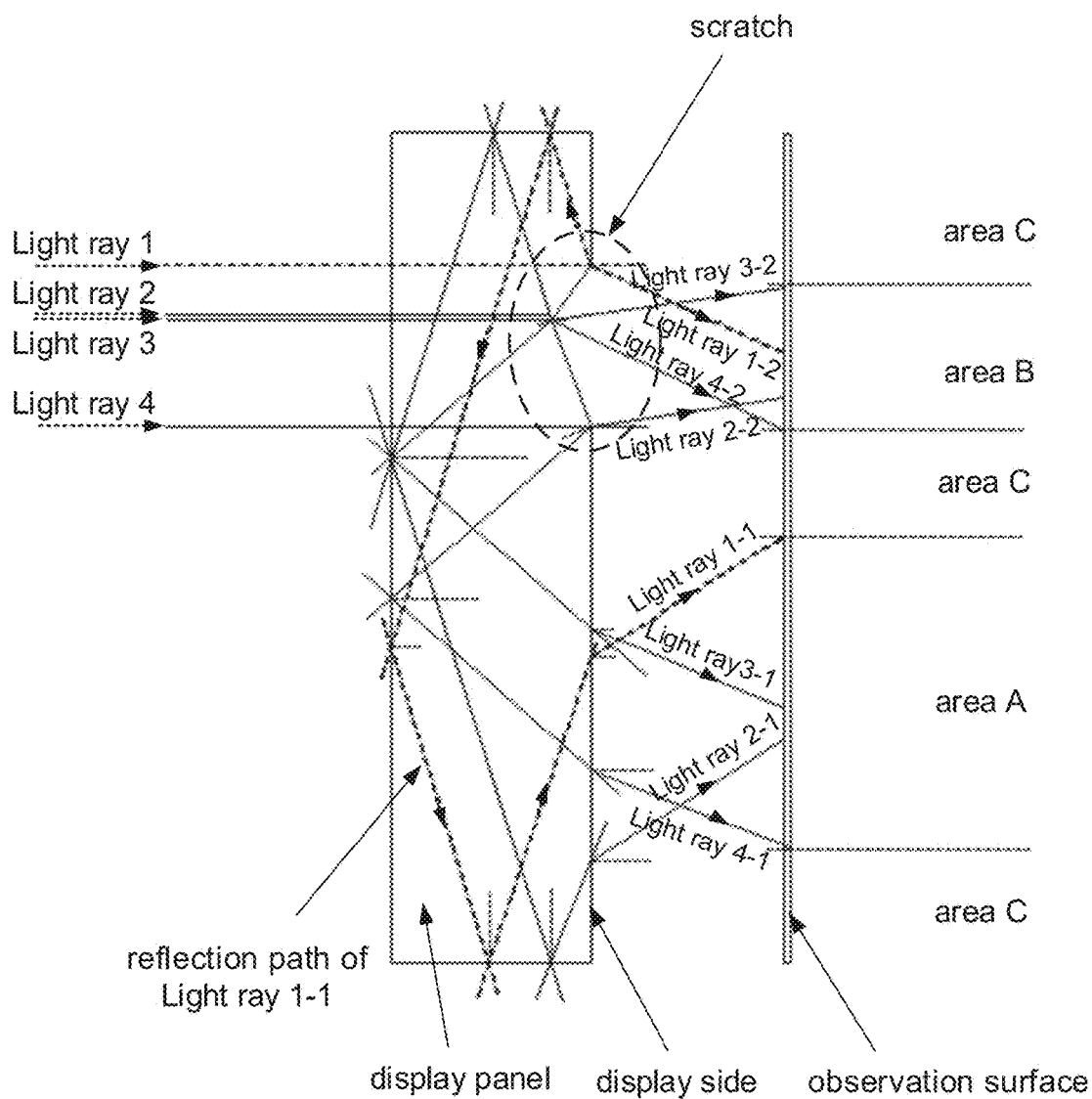
FIG. 6 is a light ray diagram of FIG. 5 that light rays passes through a scratch area.

FIG. 6 is a specific diagram of light rays travelling through an area which comprises a scratch area. From this figure, it is able to be seen that Light ray 1 irradiates a defect location such as scratch, generating refraction and reflection. Light ray 1-1 is the reflected light of Light ray 1 (wherein Light ray 1 is reflected multiple times inside the display panel and is finally emitted from a location below the scratch area shown in the figure), and Light ray 1-2 is the refracted light of Light ray 1. Light ray 2, Light ray 3 and Light ray 4 are in the same way. After the light rays irradiate the scratch area, a part of the light rays is reflected inside the display panel and is then emitted from a non-scratched area, so that after the light rays pass through, when the display panel is viewed from the display side, three kinds of areas with different brightness appear, i.e., an area A with higher brightness, an area B with lower brightness (corresponding to the scratch area), and an area C with normal brightness. After the liquid crystal display panel and the POL are fitted together, such poor display caused by slight scratch is able to be seen during a module back-end inspection. However, there is no abnormality in the other display functions and characteristics of this display product. If such a product with the slight scratch but without functional and characteristic abnormalities is directly scraped, waste is resulted in, thereby leading to reduced productivity and increased cost.

When the foregoing polarizer provided by embodiments of the present disclosure is used as the upper polarizer 01 fitted on the display side of the liquid crystal display panel, the light rays emitted from the liquid crystal display panel and having the above brightness differences first pass through the light-diffusion particle layer 11, and the diffusion particles 110 therein are able to adjust the directions of some light rays and thereby uniformize the light rays transmitted from the light-diffusion particle layer 11. After that, the light rays continue to pass through the serrated strip-shaped protrusions 120, and therefore light rays travelling in large angles are gathered. As a result, poor visibility, caused by the slight scratch in appearance which is due to various reasons and is present on the outer surface of the panel, or caused by the scratch which is created during the process of POL attaching and on the surface for attaching of the POL, is solved, thus further improving the display quality.

Alternatively, further referring to FIG. 4, the first transmission film 12 is disposed on a side, close to the pressure-sensitive adhesive layer 30, of the light-diffusion particle layer 11, and the polarizer having the structure is the lower polarizer 02 disposed on the side, close to the backlight module, of the display panel. After the light rays pass through the serrated strip-shaped protrusions 120, light rays traveling in large angles are gathered, uniformity of the light rays is thereby improved, and further the display quality is improved.

Figure 7:
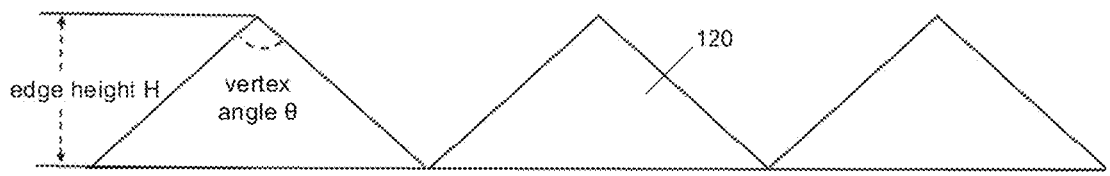
FIG. 7 is a cross-sectional structural diagram of a strip-shaped protrusion in a polarizer provided by embodiments of the present disclosure.

Based on the above, further, as shown in FIG. 7, the strip-shaped protrusions 120 in the first transmission film 12 are able to be designed in the following parameters:

The edge height of a strip-shaped protrusion 120 is in the value range of about 35 μm<the edge height≤45 μm. In one embodiment, the edge height is 35.2 μm. In another embodiment, the edge height is 40 μm. In another embodiment, the edge height is 45 μm. If the edge height is too small, the processing is difficult, and wearing occurs easily. If the edge height is too large, the effect of gathering light rays traveling in large angles is poor. Upon the edge height in the foregoing value range, the light rays traveling in large angles are to have a better uniformity after gathered by the strip-shaped protrusions 120, and the processing is easy.

A vertex angle formed by two sides of a strip-shaped protrusion 120 is in an angle range of about 115°<the vertex angle≤125°, and in this range, brightness of the light is superior. In one embodiment, the vertex angle is 115.2°. In another embodiment, the vertex angle is 120°. In one embodiment, the vertex angle is 125°.

Based on the above, further referring to FIG. 3 or FIG. 4, the light uniformizing structure 10 further comprises a second transmission film 13 disposed on the side, away from the first transmission film 12, of the light-diffusion particle layer 11. The second transmission film 13 is provided as a base for the light-diffusion particle layer 11.

The material of the first transmission film 12 is able to be polyethylene terephthalate (i.e., PET), and/or, the material of the second transmission film 13 is able to be polyethylene terephthalate (i.e., PET).

Based on the above, referring to FIG. 2, the foregoing polarizer base layer 20 is specifically able to comprise a first triacetate cellulose film (abbreviated to TAC film) 21, a polyvinyl alcohol film (abbreviated to PVA film) 23 and a second triacetate cellulose film (i.e., TAC film) 22 which are away from the light uniformizing structure 10 in sequence.

Further referring to FIG. 2, the foregoing polarizer is further able to comprise a mold release film 40 fitted on a side, away from the light uniformizing structure 10, of the pressure-sensitive adhesive layer 30, to protect the pressure-sensitive adhesive layer 30, and the mold release film 40 is to be removed upon the polarizer and the liquid crystal display panel to be fitted together. And/or, the foregoing polarizer is further able to comprise a protective film 50 fitted on a surface of the polarizer base layer 20, to protect the polarizer base layer 20 below the protective film 50.

Embodiments of the present disclosure further provide a display device, comprising a display panel and the forgoing polarizer disposed on at least one of the two sides of the display panel.

The foregoing display device is able to be a liquid crystal display device, which is able to be a product or a component having any display function, such as a liquid crystal display, a liquid crystal television, a digital picture frame, a cell phone, a tablet computer, a digital photo frame, a navigator and the like.

Further, referring to FIG. 3, when the foregoing polarizer is disposed on a display side of the display panel, as the upper polarizer 01, the light uniformizing structure 10 in the polarizer further comprises a first transmission film 12 disposed on a side, away from the display side, of the light-diffusion particle layer 11. A surface 12a, away from the light-diffusion particle layer 11, of the first transmission film 12 has a plurality of strip-shaped protrusions 120 arranged thereon in parallel, wherein each strip-shaped protrusion 120 is triangular in the cross-section perpendicular to its extension direction.

In embodiments of the present disclosure, when the foregoing polarizer is the upper polarizer 01 fitted on the display side of the liquid crystal display panel, light rays having significant differences in brightness emitted from the liquid crystal display panel first passes through the light-diffusion particle layer 11, and the diffusion particles 110 therein are able to adjust directions of some light rays, thereby uniformizing the light rays transmitted from the light-diffusion particle layer 11. After that, the light rays continue to pass through the serrated strip-shaped protrusions 120, and thereby light rays traveling in large angles are gathered. As a result, poor visibility, caused by a slight scratch in appearance which is due to various reasons and is present on the outer surface of the panel, or caused by a scratch which is created during the process of POL attaching, is solved, thus further improving display quality.

Alternatively, referring to FIG. 4, when the above polarizer is disposed on a side of the display panel which is away from the display side, as a lower polarizer 02, the light uniformizing structure 10 in the polarizer further comprises a first transmission film 12 disposed on a side, close to the display panel, of the light-diffusion particle layer 11. The surface 12a, away from the light-diffusion particle layer 11, of the first transmission film 12 has a plurality of strip-shaped protrusions 120 arranged thereon in parallel, wherein each strip-shaped protrusion 120 is triangular in the cross-section perpendicular to its extension direction.

In embodiments of the present disclosure, when the foregoing polarizer is disposed on a side, close to a backlight module, of the display panel as a lower polarizer 02, after the light rays pass through the serrated strip-shaped protrusions 120, light rays traveling in large angles are gathered, uniformity of the light rays is thereby improved, and further the display quality is improved.

The above are only specific embodiments of the present disclosure, but the protection scope of the present disclosure is not limited thereto. Any variations or replacements easily conceived by those skilled in the art within the technical scope disclosed by the present disclosure shall fall within the protection scope of the present disclosure. Therefore, the protection scope of the present disclosure should be subject to the protection scope of the claims.

What is claimed is:

1. A display device, comprising:
a display panel; and
a polarizer disposed on a display side of the display panel, wherein the polarizer comprises:
a polarizer base layer and a pressure-sensitive adhesive layer, and
a light uniformizing structure disposed between the polarizer base layer and the pressure-sensitive adhesive layer, the light uniformizing structure comprises a light-diffusion particle layer and a first transmission film, wherein,
the light-diffusion particle layer is configured to improve uniformity of light rays passing through the polarizer; and
a surface, away from the light-diffusion particle layer, of the first transmission film has a plurality of strip-shaped protrusions arranged thereon in parallel, and each of the plurality of trip-shaped protrusions is triangular in a cross-section perpendicular to its extension direction;
wherein, the pressure-sensitive adhesive layer is disposed close to the display panel, the polarizer base layer is disposed far away from the display panel; and the light-diffusion particle layer is disposed close to the pressure-sensitive adhesive layer, the first transmission film is disposed close to the polarizer base layer.

2. The display device according to claim 1, wherein a shape of a diffusion particle in the light-diffusion particle layer is spherical.

3. The display device according to claim 1, wherein a particle size of a diffusion particle in the light-diffusion particle layer is 1 to 20 µm.

4. The display device according to claim 1, wherein a material of a diffusion particle in the light-diffusion particle layer is at least one of poly styrene, polymethyl methacrylate, polycarbonate or silica.

5. The display device according to claim 1, wherein a main body of the light-diffusion particle layer is a transparent film layer.

6. The display device according to claim 1, wherein an edge height of one of the plurality of strip-shaped protrusions is in a value range of 35 µm<the edge height ≤45 µm.

7. The display device according to claim 1, wherein a vertex angle formed by two sides of one of the plurality of strip-shaped protrusions is in an angle range of 115°<the vertex angle ≤125°.

8. The display device according to claim 1, wherein the light uniformizing structure further comprises a second transmission film disposed on a side, away from the first transmission film, of the light-diffusion particle layer.

9. The display device according to claim 8, wherein a material of the first transmission film is polyethylene terephthalate, and/or, a material of the second transmission film is polyethylene terephthalate.

10. The display device according to claim 1, wherein the polarizer base layer comprises a first triacetate cellulose film, a polyvinyl alcohol film and a second triacetate cellulose film which are away from the light uniformizing structure in sequence.

* * * * *